US012619688B2

(12) United States Patent
Chen et al.

(10) Patent No.: US 12,619,688 B2
(45) Date of Patent: May 5, 2026

(54) DOCUMENT SHARING PROTECTION WITH WATERMARK

(71) Applicant: Microsoft Technology Licensing, LLC, Redmond, WA (US)

(72) Inventors: Xi Chen, Redmond, WA (US); Kalin Georgiev Toshev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 449 days.

(21) Appl. No.: 18/177,697

(22) Filed: Mar. 2, 2023

(65) Prior Publication Data
US 2024/0296209 A1 Sep. 5, 2024

(51) Int. Cl.
| | |
|---|---|
| *G06F 21/16* | (2013.01) |
| *G06K 7/14* | (2006.01) |

(52) U.S. Cl.
CPC ........... *G06F 21/16* (2013.01); *G06K 7/1447* (2013.01)

(58) Field of Classification Search
CPC .... G06F 21/6245; G06F 21/10; G06F 21/554; G06F 21/62; G06F 2221/032; G06F 3/1239; G06T 1/0021; G06T 1/0028; G06T 1/0035; G06T 1/0071; G06T 2201/00; G06T 2201/005; G06T 2201/0061; G06T 2201/0062; G06T 2201/0064; G06T 3/4038; G06T 2207/10016; H04L 2209/608; H04L 2209/60; H04L 9/088; H04L 2463/146; H04N 21/83; H04N 21/835; H04N 21/8358; H04N 21/4312; H04N 21/4316; H04N 21/4318; H04N 1/32101; H04N 1/32144; H04N 1/32149; H04N 1/32309; H04N 1/3232; H04N 1/32325; H04N 1/32336; G06V 10/20; G09G 2340/12; G09G 2340/125; G09G 2358/00
See application file for complete search history.

(56) References Cited

U.S. PATENT DOCUMENTS

| | | | |
|---|---|---|---|
| 8,886,944 | B2 | 11/2014 | Mastrangelo et al. |
| 9,123,106 | B2 | 9/2015 | Homme et al. |
| 11,403,373 | B2 | 8/2022 | Fleck et al. |

(Continued)

FOREIGN PATENT DOCUMENTS

| | | |
|---|---|---|
| CN | 108551540 A | 9/2018 |

OTHER PUBLICATIONS

International Search Report and Written Opinion received for PCT Application No. PCT/US2024/017193, Jun. 25, 2024, 13 pages.

(Continued)

*Primary Examiner* — Brian F Shaw
(74) *Attorney, Agent, or Firm* — Alleman Hall LLP

(57) ABSTRACT

Provided is a computing system for protection against document sharing. The computing system includes a processor having associated memory, the processor being configured to execute instructions using portions of the memory to cause the processor to implement a compliance portal where a policy is established covering a plurality of documents, transmit the policy to a client device having a display screen, and in response to receiving an indication that the client device has triggered the policy, instruct the client device to modify a graphics pipeline to add an opaque watermark to a screen image displayed on the display screen.

20 Claims, 7 Drawing Sheets

(56)　　　　References Cited

U.S. PATENT DOCUMENTS

| | | | |
|---|---|---|---|
| 2006/0170974 | A1 | 8/2006 | Wang et al. |
| 2008/0089554 | A1 | 4/2008 | Tabankin |
| 2014/0247961 | A1* | 9/2014 | Kim ................... H04N 21/4312 |
| | | | 382/100 |
| 2016/0127265 | A1* | 5/2016 | Cavage ................... G06F 16/22 |
| | | | 709/226 |
| 2019/0087927 | A1* | 3/2019 | Dewitt .................. G06T 1/0021 |
| 2019/0294762 | A1 | 9/2019 | Prem Bianzino |
| 2019/0394353 | A1* | 12/2019 | Valencia Reyes .... G06F 3/1256 |
| 2020/0151345 | A1* | 5/2020 | Chauhan ................. G06F 21/16 |
| 2022/0043890 | A1 | 2/2022 | Choi |

OTHER PUBLICATIONS

"Fasoo Smart Screen", Retrieved From: https://en.fasoo.com/products/fasoo-smart-screen/, Retrieved Date: Jan. 13, 2023, 3 Pages.

"Invisible Watermark: our patented technology", Retrieved From: https://www.imatag.com/digital-watermarking/, Retrieved Date: Jan. 13, 2023, 13 Pages.

"Screen Watermark", Retrieved From: https://www.wisdomgather.com/en/wgc/screen-watermark/, Retrieved Date: Jan. 13, 2023, 5 Pages.

"Screen Watermark Open Source for Business", Retrieved from: https://github.com/L4TN/Watermark-Screen, May 1, 2022, 3 Pages.

"Screen Watermark Solution", Retrieved from: https://datapatrol.com/screen-watermark/, Retrieved Date: Jan. 13, 2023, 5 Pages.

"Smartly Protect All Your Sensitive Documents", Retrieved From: https://www.docsend.com/features/dynamic-watermarking/, Retrieved Date: Jan. 13, 2023, 6 Pages.

Eze, et al., "Integrity Verification in Medical Image Retrieval Systems using Spread Spectrum Steganography", In Proceedings of International Conference on Multimedia Retrieval, Jun. 10, 2019, pp. 53-57.

Favorskaya, et al., "Detecting Relevant Regions for Watermark Embedding in Video Sequences Based on Deep Learning", In International Conference on Intelligent Decision Technologies, Jun. 12, 2020, pp. 129-139.

Piec, et al., "Real-Time Screen Watermarking Using overlaying layer", In Proceedings Ninth International Conference on Availability, Reliability and Security, Sep. 8, 2014, 10 Pages.

Sheldon, Robert, "Can IT add digital watermarks to its virtual desktops?", Retrieved From: https://www.techtarget.com/searchvirtualdesktop/answer/Can-IT-add-digital-watermarks-to-its-virtual-desktops, Jul. 6, 2018, 3 Pages.

Tayan, et al., "An Adaptive Zero-Watermarking Approach for Text Documents Protection", In International Journal of Image Processing Techniques, vol. 1, Issue 1, May 2013, pp. 205-208.

"Screen Watermark", Retrieved from: https://www.xsecuritas.com/screen-watermark/, Retrieved Date: Jan. 13, 2023, 7 Pages.

* cited by examiner

46

| REGION 1 | REGION 2 | REGION 3 | REGION 4 | REGION 5 |
|---|---|---|---|---|
| REGION 6 | REGION 7 | REGION ... | REGION ... | REGION ... |
| REGION ... | REGION ... | REGION ... | REGION ... | REGION ... |
| REGION ... | REGION ... | REGION ... | REGION ... | REGION ... |
| REGION ... | REGION ... | REGION ... | REGION ... | REGION ... |

| 1 | 2 | ... | ... | ... | ... | ... | ... | ... | ... | ... | ... | ... | ... | ... | 16 |
|---|---|---|---|---|---|---|---|---|---|---|---|---|---|---|---|
| 17 | ... | ... | ... | ... | ... | ... | ... | ... | ... | ... | ... | ... | ... | ... | 32 |
| 33 | ... | ... | ... | ... | ... | ... | ... | ... | ... | ... | ... | ... | ... | ... | 48 |
| 49 | ... | ... | ... | ... | ... | ... | ... | ... | ... | ... | ... | ... | ... | ... | 64 |
| 65 | ... | ... | ... | ... | ... | ... | ... | ... | ... | ... | ... | ... | ... | ... | 80 |
| 81 | ... | ... | ... | ... | ... | ... | ... | ... | ... | ... | ... | ... | ... | ... | 96 |
| 97 | ... | ... | ... | ... | ... | ... | ... | ... | ... | ... | ... | ... | ... | ... | 112 |
| 113 | ... | ... | ... | ... | ... | ... | ... | ... | ... | ... | ... | ... | ... | ... | 128 |
| 129 | ... | ... | ... | ... | ... | ... | ... | ... | ... | ... | ... | ... | ... | ... | 144 |
| 145 | ... | ... | ... | ... | ... | ... | ... | ... | ... | ... | ... | ... | ... | ... | 160 |
| 161 | ... | ... | ... | ... | ... | ... | ... | ... | ... | ... | ... | ... | ... | ... | 176 |
| 177 | ... | ... | ... | ... | ... | ... | ... | ... | ... | ... | ... | ... | ... | ... | 192 |
| 193 | ... | ... | ... | ... | ... | ... | ... | ... | ... | ... | ... | ... | ... | ... | 208 |
| 209 | ... | ... | ... | ... | ... | ... | ... | ... | ... | ... | ... | ... | ... | ... | 224 |
| 225 | ... | ... | ... | ... | ... | ... | ... | ... | ... | ... | ... | ... | ... | ... | 240 |
| 241 | ... | ... | ... | ... | ... | ... | ... | ... | ... | ... | ... | ... | ... | ... | 256 |

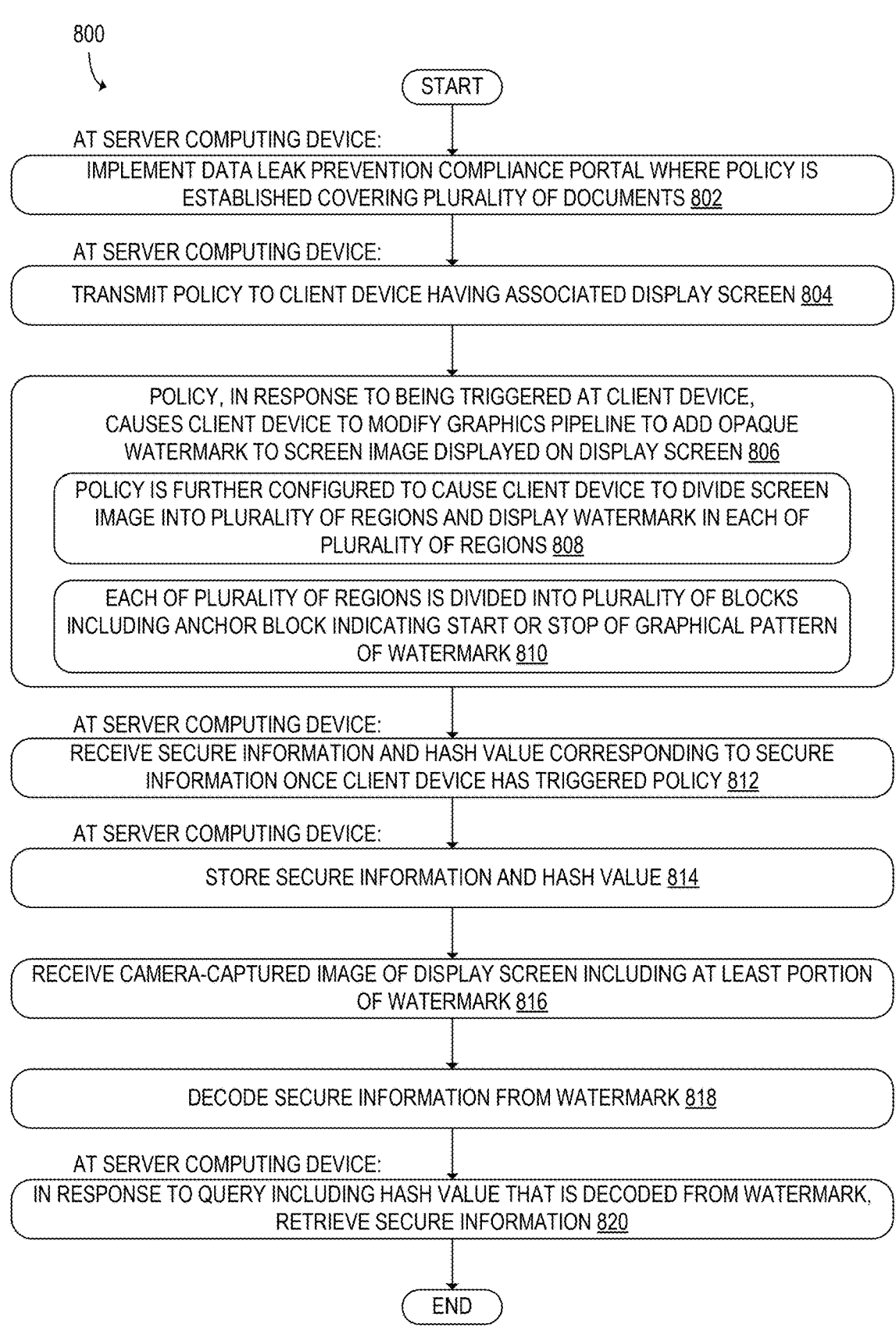

800

START

AT SERVER COMPUTING DEVICE:
IMPLEMENT DATA LEAK PREVENTION COMPLIANCE PORTAL WHERE POLICY IS ESTABLISHED COVERING PLURALITY OF DOCUMENTS 802

AT SERVER COMPUTING DEVICE:
TRANSMIT POLICY TO CLIENT DEVICE HAVING ASSOCIATED DISPLAY SCREEN 804

POLICY, IN RESPONSE TO BEING TRIGGERED AT CLIENT DEVICE, CAUSES CLIENT DEVICE TO MODIFY GRAPHICS PIPELINE TO ADD OPAQUE WATERMARK TO SCREEN IMAGE DISPLAYED ON DISPLAY SCREEN 806

POLICY IS FURTHER CONFIGURED TO CAUSE CLIENT DEVICE TO DIVIDE SCREEN IMAGE INTO PLURALITY OF REGIONS AND DISPLAY WATERMARK IN EACH OF PLURALITY OF REGIONS 808

EACH OF PLURALITY OF REGIONS IS DIVIDED INTO PLURALITY OF BLOCKS INCLUDING ANCHOR BLOCK INDICATING START OR STOP OF GRAPHICAL PATTERN OF WATERMARK 810

AT SERVER COMPUTING DEVICE:
RECEIVE SECURE INFORMATION AND HASH VALUE CORRESPONDING TO SECURE INFORMATION ONCE CLIENT DEVICE HAS TRIGGERED POLICY 812

AT SERVER COMPUTING DEVICE:
STORE SECURE INFORMATION AND HASH VALUE 814

RECEIVE CAMERA-CAPTURED IMAGE OF DISPLAY SCREEN INCLUDING AT LEAST PORTION OF WATERMARK 816

DECODE SECURE INFORMATION FROM WATERMARK 818

AT SERVER COMPUTING DEVICE:
IN RESPONSE TO QUERY INCLUDING HASH VALUE THAT IS DECODED FROM WATERMARK, RETRIEVE SECURE INFORMATION 820

END

FIG. 8

DOCUMENT SHARING PROTECTION WITH WATERMARK

BACKGROUND

Data protection is an area of rising interest across a wide variety of industries and organizations. Whether for privacy, regulation compliance, competition, anti-piracy, or other reasons, many organizations implement some sort of data protection policy to prevent the intentional or accidental distribution of confidential data. Some modes of data leakage have proven technically difficult for organizations to prevent. For example, when a picture is taken of a display screen with a separate device such as a phone camera and then distributed outside of the organization, even accidentally, many security measures such as passwords and user authentication fail to prevent the spread or recurrence of the distribution.

SUMMARY

A computing system for protection against document sharing may include a processor having associated memory. The processor may be configured to execute instructions using portions of the memory to cause the processor to implement a compliance portal where a policy is established covering a plurality of documents, transmit the policy to a client device having a display screen, and in response to receiving an indication that the client device has triggered the policy, instruct the client device to modify a graphics pipeline to add an opaque watermark to a screen image displayed on the display screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a schematic view of regions in a screen image displayed on a client device according to a policy generated by a data leak compliance portal of a server computing device and implemented by a data leak compliance service of the client device of the computing system of FIG. 1.

FIG. 3 shows a schematic view of blocks within one of the regions of the screen image of FIG. 2.

FIG. 8 shows a flowchart of a method for protection against unauthorized document sharing, according to one example of the present disclosure.

DETAILED DESCRIPTION

Figure 1:
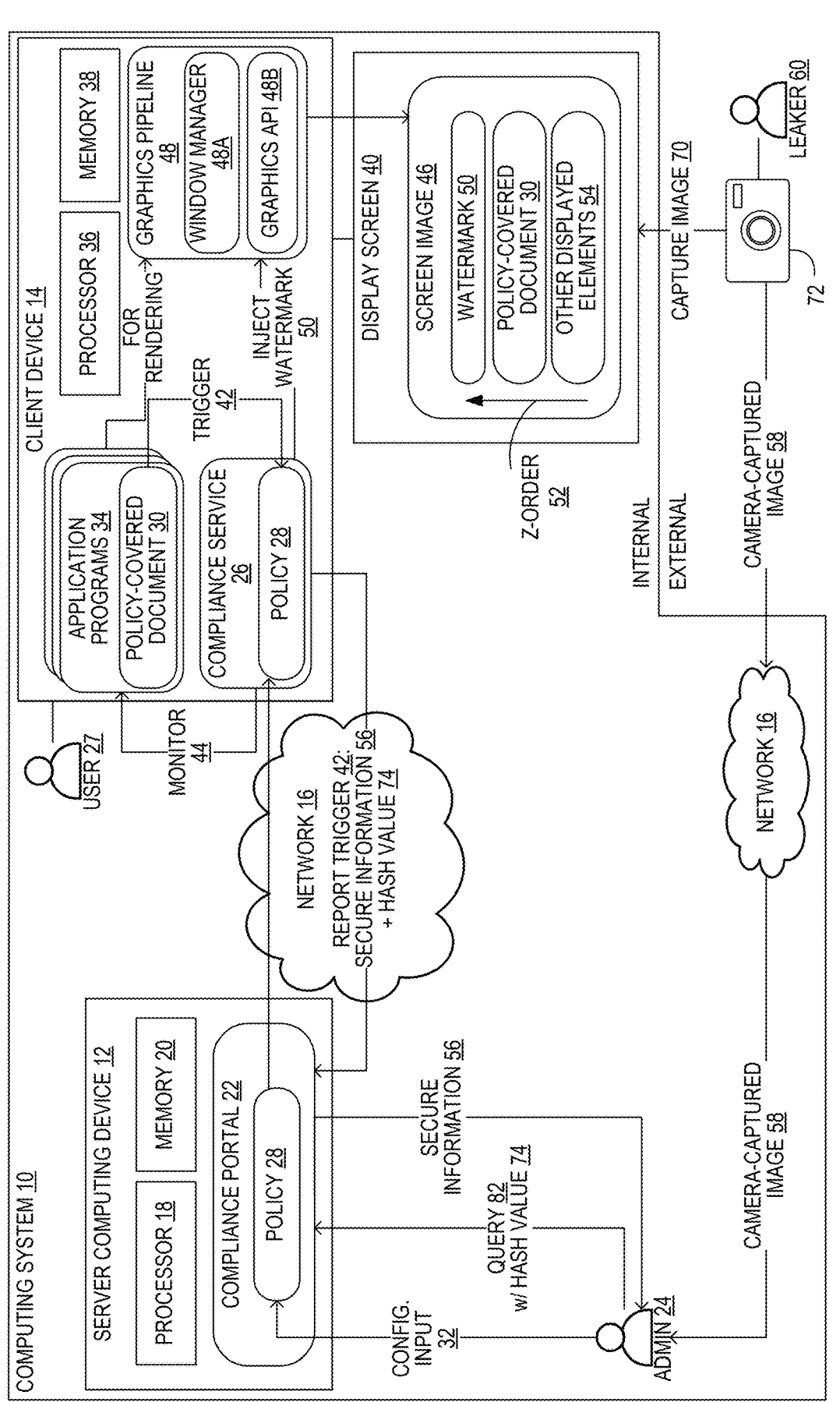
FIG. 1 shows a schematic view of a computing system for protection against unauthorized document sharing, according to one example of the present disclosure.

To address the issues discussed above, a computing system 10 is provided for protection against unauthorized document sharing, as shown in FIG. 1. Computing system 10 includes a server computing device 12 that communicates with a client device 14 via a computer network 16, such as the Internet. The server computing device 12 includes one or more processors 18 having associated memory 20. The one or more processors 18 are configured to execute instructions using portions of the memory 20 to cause the server computing device 12 to implement a data leak prevention compliance portal 22. The compliance portal 22 may provide the server computing device 12 with the capability to control access to various confidential or protected documents and information, and may further implement a watermarking feature described below in order to, when confidentiality is breached, quickly trace and address any leaks to prevent further leaks.

The client device 14 is configured to be joined to an organization as defined at the compliance portal 22 of the server computing device 12. By virtue of being joined to the organization, the client device 14 is configured to be under the administration of an administrator 24 of the organization, and the data leak prevention compliance portal 22 has access privileges sufficient to install a compliance service 26 on the client device 14. The data leak prevention compliance portal 22 communicates with the compliance service 26 client device 14 via the computer network 16. It will be appreciated that the various instances of network 16 may be the same or a different network. The compliance service 26 may be a standalone service or may be one feature of a greater integrated security product. In one implementation, the compliance service 26 includes a daemon component configured to interact with various agents for servicing information and enforcement for a user 27 of the client device 14.

The data leak prevention compliance portal 22 is configured to establish a policy 28 covering a plurality of documents 30 of an organization, typically based on configuration input 32 from the administrator 24. The documents 30 can be documents generated by or accessible using one or more application programs 34 executed on the client device 14 to view the documents 30, such as word processing documents, text and/or image format files, videos, etc. The data leak prevention compliance portal 22 is configured to transmit the policy 28 to the client device 14 over the network 16.

The client device 14 is a computing device such as a laptop, desktop, smartphone, or tablet computer including a processor 36 and memory 38 storing instructions to implement various software modules and perform the functions described herein. The client device 14 also has an associated display screen 40, on which a screen image 46 is displayed. The display screen 40 can be an internal display housed in a same housing as the processor 36 and memory 38, or an external display connected via a wired or wireless connection. The screen image 46 is not merely an image displayed in a portion of the display screen 40 such as one application program 34 that is currently windowed, but rather is the final rendered screen image displayed by the entire display screen 40.

The compliance service 26 executed by processor 36 on the client device 14 is configured to enforce the policy 28. The policy 28, it will be understood, consists of trigger conditions 42 and associated actions to be taken in the event the trigger conditions 42 are met. Specifically, the trigger conditions 42 include a policy-covered document 30 being displayed on display screen 40, and the associated action to be taken by the compliance service includes causing watermark 50 to be displayed across the entire screen image 46 during the display of the policy-covered document 30. For multiple display screen 40 setups, the client device 14 may be configured to similarly control each display screen 40 and the compliance service 26 and/or compliance portal 22 may include configurable settings to extend the policy 28 to one or all display screens 40, for example, by affecting the display screen 40 currently displaying the policy-covered document 30 or all display screens 40 at once. In other embodiments, the policy 24 may define a watermarked screen region within which the watermark 50 is to be displayed, which includes substantially all of the space on the display screen 40 on which documents 30 can be displayed, but that is less than the entire screen image 46. For example, the watermarked screen region could include all pixels in the screen image 46 except a narrow border around the edge of the screen image a few pixels wide, such that 99% of the screen image is included in the watermarked screen region.

The compliance service 26 may monitor 44 the application programs 34 by use of, for example, one or more hooks to interrupt a graphics pipeline 48. Accordingly, the policy 28, in response to being triggered at the compliance service 26 of the client device 14, causes the client device 14 to modify the graphics pipeline 48 to add an opaque watermark 50 to the screen image 46 displayed on the display screen 40. Graphics pipeline 48 includes a windows manager 48A and a graphics application programming interface (API) 48B. The windows manager 48A may be, for example, the DESKTOP WINDOWS MANAGER of MICROSOFT CORPORATION, or a WINDOWS SERVER found in MACOS of APPLE CORPORATION, as two examples. The graphics API 48B may be DIRECTX of MICROSOFT CORPORATION or METAL of APPLE CORPORATION, as two examples. Accordingly, by injecting the watermark 50 into the graphics pipeline 48, the compliance service 26 may be able to alter the screen image 46 at an operating system (OS) level, rather than at an application program 34 level. The windows manager 48A is configured to render each window as it will appear in the screen image 46, layered in a z-order 52, using portions of the graphics API 48B.

The compliance service 26 instructs the graphics pipeline 48 to render the watermark 50 at a highest level in the z-order 52, so that it is displayed over all other screen content, and thus the watermark 50 is not restricted to a single application program 34 that has opened the policy-covered document 30. Accordingly, the screen image 46 includes at least one policy-covered document 30 and the watermark 50 displayed thereover. Other displayed elements 54 such as other windows or desktop elements may also be displayed under the watermark 50 within the screen image 46. It will be appreciated that the policy-covered document 30 is shown above the other displayed elements 54 in the z-order 52, but some other displayed elements 54 may be displayed over portions of the policy-covered document 30 as well. The policy may be configured to add the watermark 50 only when at least a portion of the policy-covered document 30 is visible in the screen image 46. Alternatively, the policy 28 may stipulate that the watermark 50 added to the screen image 46 at any time that the policy-covered document 30 is open, whether the document 30 is currently even partially visible or not under other displayed elements 54.

The watermark 50 may encode secure information 56. For example, the secure information 56 can include one or more of a document file name, a document file type, a document file path, a timestamp, and a device and/or user identifier of the client device 14. In this manner, the secure information 56 may be used to trace a leak back to its source so that the response to the leak may be managed, including revising the policy 28 or training the user 27, for example. Because the secure information 56 is secure, the leak does not leak additional information in the watermark 50 on top of the information displayed in the policy-covered document 30, but the secure information 56 is nonetheless accessible and usable by the administrator 24 or others with sufficient privileges that are internal to the organization using the computing system 10.

One example implementation of the watermark 50 will be described below with reference to FIGS. 2-4, in which the secure information 56 is encoded in a graphical pattern of the watermark 50. By encoding the secure information 56 graphically, the secure information 56 is decodable only by those with privileges and furthermore, are included not only in a screenshot generated by the client device 14 itself, but also in a camera-captured image 58 taken either by the same user 27 or a leaker 60. In this example, the policy 28 is further configured to cause the client device 14 to divide the screen image 46 into a plurality of regions 62 (see FIG. 2) and display the watermark 50 in each of the plurality of regions 62 (see FIG. 4 for display of a tile of the watermark 50 repeated in each region 62). The number of regions 62 may be set appropriately depending on the complexity of the graphical pattern, fineness of the constituent parts of the pattern, and resolution of the display screen 40, among other factors. By repeating the watermark 50 across the display screen 40 in each region 62, when only a partial image is captured of the screen image 46, the secure information 56 can still be decoded.

Next, each of the plurality of regions 62 is divided into a plurality of blocks 64 including an anchor block 64A indicating a start or a stop of the graphical pattern of the watermark 50. It will be appreciated that multiple blocks 64 together may form the anchor block 64A to reduce the chance of error and make the anchor blocks 64A more easily spotted. For example, the block 64 numbered 1 may be the start anchor block 64A and the block 64 numbered 256 may be the end anchor block 64A. As with the regions 62, the number of blocks 64 may be set appropriately based on various parameters such as the complexity of the graphical pattern, fineness of the constituent parts of the pattern, and resolution of the display screen 40, and the expected number of unique watermarks 50 to be generated for the organization. While each block 64 may include any predetermined amount of data according to configuration by the administrator 24, for example, each block 64 may encode 1 bit of data in the graphical pattern such that the graphical pattern of one region 62 formed of the plurality of blocks 64 encodes a plurality of bits of data. Accordingly, a simple and short string of data may be encoded into the watermark 50 in a customizable manner.

Figure 4:
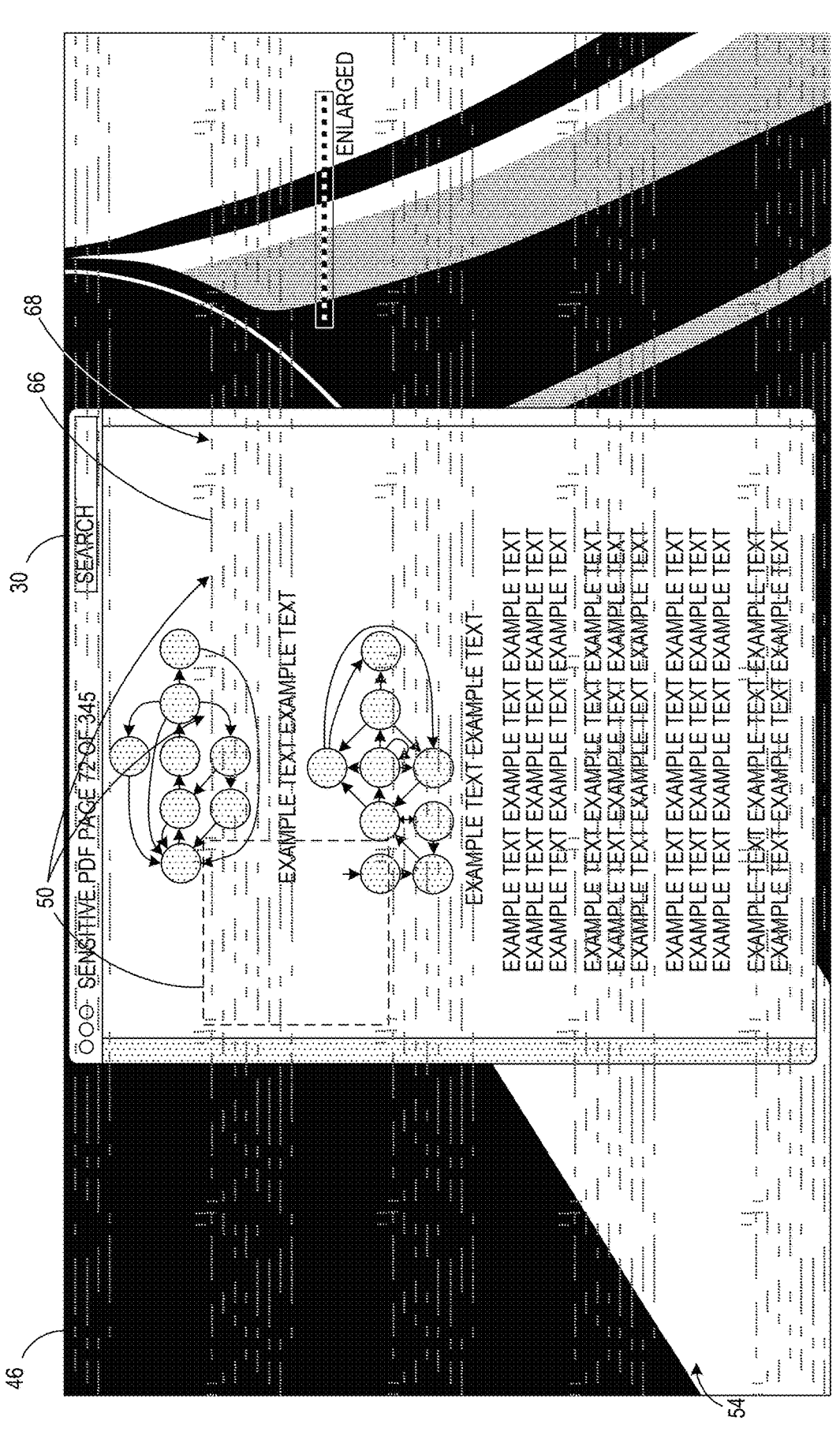
FIG. 4 shows an example screen image displayed on the client device of the computer system of FIG. 1, including a watermark displayed according to the regions and blocks of FIGS. 2 and 3.

Turning now to FIG. 4, the example graphical pattern illustrates a binary code using at least one of dots and dashes, illustrated here by way of example as dots 66 grouped together in fours to form a dash 68. Here, 4 horizontal dots indicate a 1 and no dots indicate a 0, within each block 64, although any suitable pattern may be adopted. For example, dashed lines not formed of dots may be utilized. Furthermore, four vertical dots in the region 62 may indicate one of the anchor blocks 64A so that the start and stop of the graphical pattern may be recognized and analysis may be commenced. By using such tiny constituent parts as dots, dashes, or dot-dashes (dashes formed of dots), the underlying document 30 is not obscured and access for the user 27 is not hindered. The watermark 50 may be a single color/shade essentially provided as a transparent window on top of the z-order 52, or, as illustrated, the watermark 50 may be displayed inverted compared to the underlying shade of content that would be displayed in the screen image 46 without being modified by adding the watermark 50. For example, a shader in the graphics pipeline may be engaged to reverse the displayed shade at only the location of each dot 66 of the watermark 50. One copy or tile of the watermark 50 is boxed in a dashed line for illustration of how the watermark 50 may be displayed across the screen image 46 in a repeating manner.

Returning briefly to FIG. 1, it will be appreciated that when a user of the client device 14 travels to an unsecure location, such as when traveling outside of the physical facilities of the organization with the client device 14 that may be a mobile or portable device such as a laptop, smartphone, or tablet, persons not authorized to view the policy-covered documents 30 may be in physical proximity of the display screen 40 and able to view the policy-covered documents. Alternatively, the leaker 60 may gain access to the client device 14 on-site within a facility of the organization or home of the user 27, for example. In any situation, the leaker 60 may capture 70 an image of the display screen 40 using a camera 72, which may be any sort of camera 72 such as a standalone digital or film camera, or an in-device camera such as a smartphone or tablet camera. The camera 72 may produce a camera-captured image 58 (see also FIG. 5) of the display screen 40 including at least a portion of the watermark 50, that is, the camera-captured image 58 may be deliberately taken of the entire display screen 40, but may also be incidentally captured when taking a picture of an object in front of the display screen 40 and only partially capture the display screen 40, etc. Furthermore, the computing system 10 can function to trace and prevent leaks regardless of whether the leaker 60 is a third party or the user 27 themselves, and whether the leak is intentional or inadvertent.

The leaker 60 may upload the camera-captured image 58 to the network 16, or the camera-captured image 58 may be obtained by the administrator 24 or another person with organizational privileges able to access the server computing device 12. In general, the server computing device 12 is configured to receive the camera-captured image 58 and decode the secure information 56 from the watermark 50. Thus, the secure information 56 which was kept secure in the watermark 50 is usable by the organization to trace the leak and find out when, by whom, and what was leaked. In one specific implementation, the secure information 56 is encoded in the watermark as a hash value 74 of any suitable algorithm such as MD5 which is capable of both keeping the secure information 56 secure when leaked outside of the organization and also being reduced down to a visually encodable amount of data as the hash value 74. Before the leak, the compliance service is configured to record the secure information 56 and generate the hash value 74, and the server computing device 12 is configured to receive the secure information 56 and the hash value 74 corresponding to the secure information 56 once the client device 14 has triggered the policy 28. This data may be sent from the compliance service 26 to the compliance portal 22 in a policy trigger report indicating that one of the trigger conditions 42 has been met (e.g., that the policy-covered document has been opened on the client device 14), and the compliance service may use the generated hash value 74 to create the graphical pattern of the watermark 50 as discussed above. The server computing device may then store the secure information 56 and hash value 74 in the memory 20 or a database, etc. for later retrieval.

Figure 5:
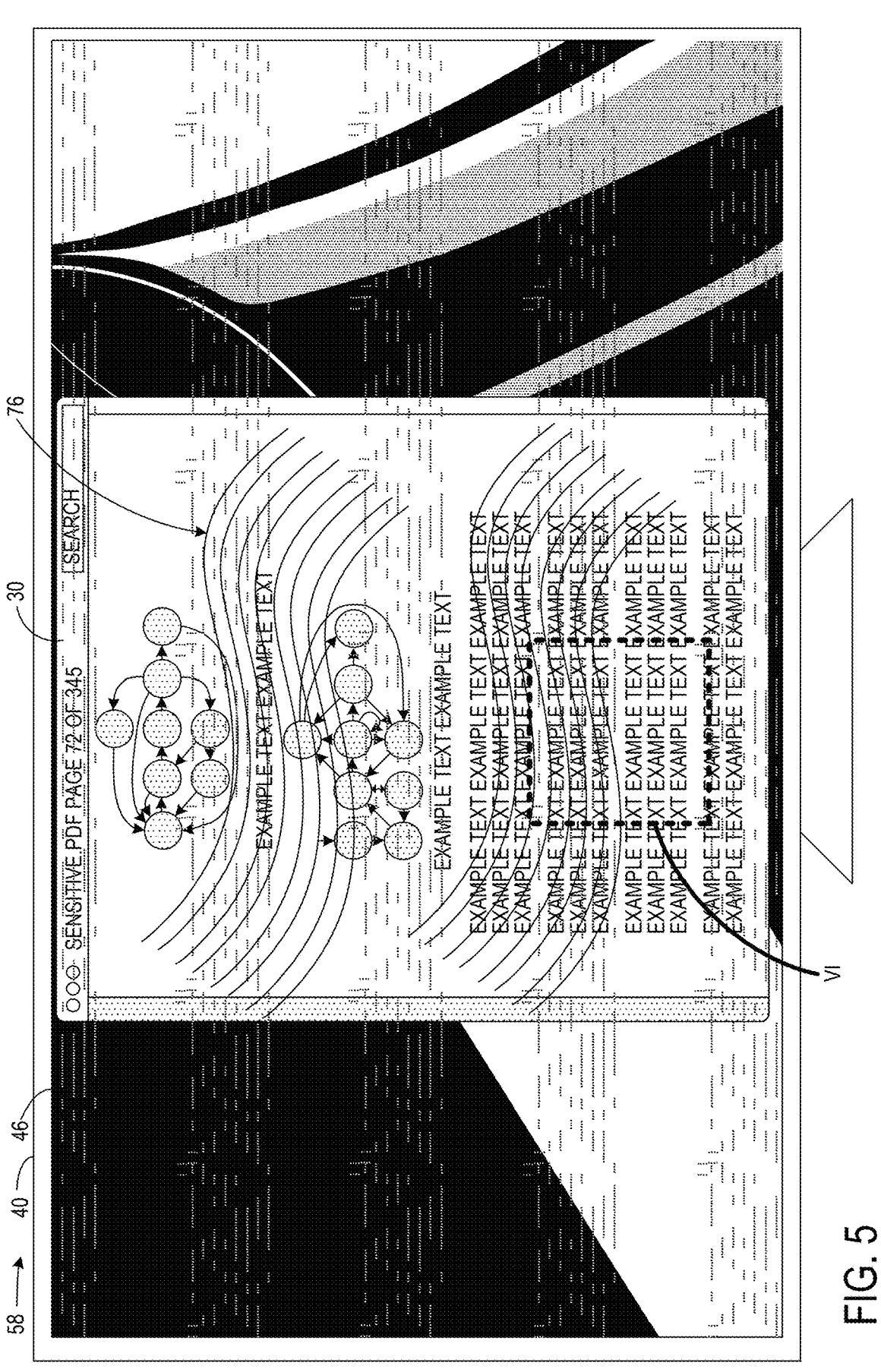
FIG. 5 shows an example camera image captured by a camera, including the screen image of FIG. 4.

As mentioned above, the computing system 10 may function to protect the organization against leaks both in computer screenshots as well as camera-captured images by using the opaque watermark 50. A screenshot is a clean and clear digitally produced image of the screen image 46 or a portion thereof. By contrast, the camera-captured image 58 shown in FIG. 5 has lost some resolution compared to a screenshot such as the image used as the basis for FIG. 4. In addition, the camera 72 may be directed off-center from the display screen 40 and may be angled poorly for good retrieval of information by other methods. Moreover, it is well known that display screens tend to induce artifacts 76 when photographed by cameras, which are typically colored swirls that can distort the screen image 46 shown in the camera-captured image 58. Even though the camera angle for FIG. 5 is relatively close to normal to the center of the display screen 40, substantial artifacts 76 are already present and would likely be worse at a less normal angle. These factors combined may greatly reduce the effectiveness of non-opaque watermarks, and further still, the opaque watermark 50 may present a robust defense against automatic attempts at removal of the watermark 50 in the camera-captured image 58 by artificial intelligence (AI) means. Thus, as the more difficult of the two leaked images to reliably handle, it is the camera-captured image 58 that is discussed extensively herein.

Figure 7:
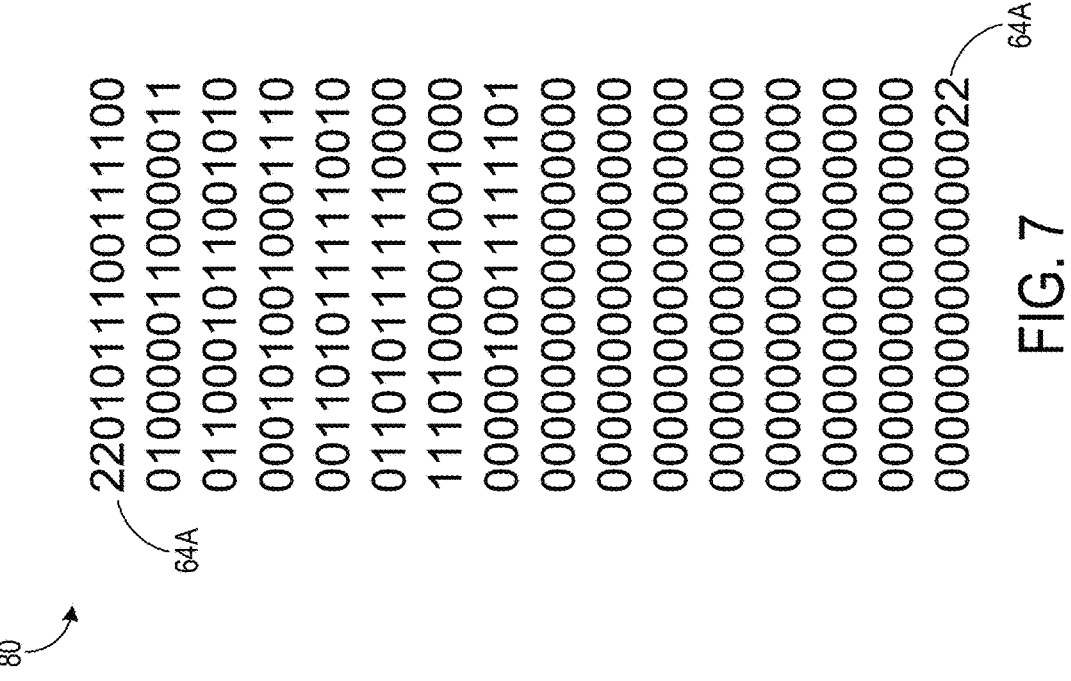
FIG. 7 shows a schematic view of extracted code computed by performing image processing on the portion of the camera image shown in FIG. 6.
Figure 6:
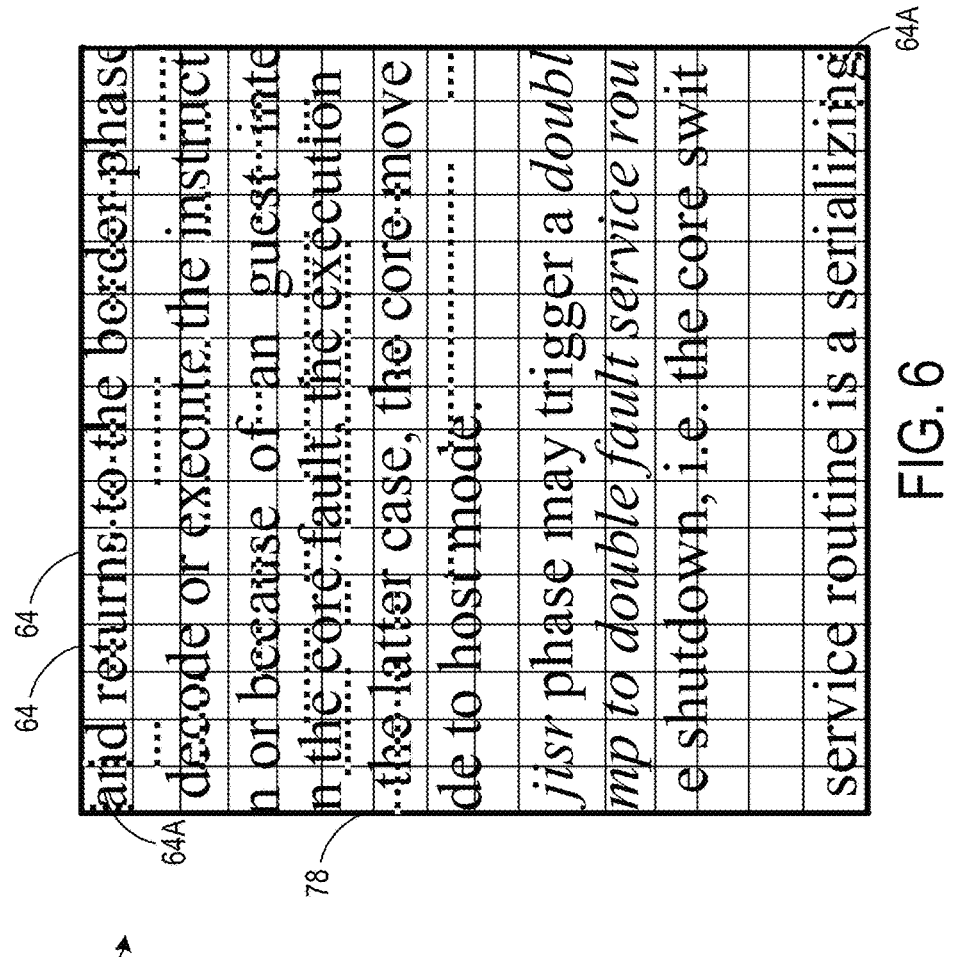
FIG. 6 shows partial detail view of a section VI of the camera image of FIG. 5, showing a portion of the watermark of the screen image as captured in the camera image.

Continuing to FIG. 6, a section VI indicated in FIG. 5 is enlarged for analysis. Gridlines 78 are applied in FIG. 6 merely for ease of identifying the blocks 64 of the watermark 50, including the anchor blocks 64A. Using the code described above in which four horizontal dots forming a dash within a block 64 is 1 and no dots in a block 64 is 0, starting with the top left anchor block 64A and reading left to right, top to bottom, a (mostly) binary code 80 in FIG. 7 is output. Of course, the reading order is arbitrary, as long as the encoding and decoding are performed the same way. After removing the anchor blocks 64A which are represented by 2, the remaining binary code 80 is easily converted to a hexadecimal string: 5cf1060d8b2854. This string is the hash value 74. Finally, in response to a query 82 including the hash value 74 that is decoded from the watermark 50, the server computing device 12 is configured to retrieve the secure information 56. That is, the server computing device 12 receives the hash value 74 from the administrator 24 and uses it to look up the stored secure information 56 associated with the hash value 74 and return the secure information 56 to the administrator 24. Accordingly, as compared to a watermark that simply adds the secure information 56 as plain text that can be read by anyone that sees the camera-captured image 58, or in a standardized code such as a two-dimensional barcode that uses a public method of encoding and decoding, the organization using the watermark 50 has avoided publishing the secure information 56 and instead kept it secure in the server computing device 12 backend. In addition, the watermark 50 is able to be opaque (non-transparent) without unduly obscuring the screen image 46 compared to both plain text and a two-dimensional barcode.

FIG. 8 shows a flowchart for a method 800 for protection against unauthorized document sharing. The method 800 may be implemented by the computing system 10 illustrated in FIG. 1.

At 802, the method 800 may include, at a server computing device, implementing a data leak prevention compliance portal where a policy is established covering a plurality of documents. At 804, the method 800 may include, at the server computing device, transmitting the policy to a client device having an associated display screen. At 806, the policy, in response to being triggered at the client device, may cause the client device to modify a graphics pipeline to add an opaque watermark to a screen image displayed on the display screen. Accordingly, as discussed above, the opaque watermark may be injected into the graphics pipeline at the OS level and provide a robust trail for tracing a data leak.

At 808, according to one implementation, the policy is further configured to cause the client device to divide the screen image into a plurality of regions and display the watermark in each of the plurality of regions. Then, at 810, each of the plurality of regions is divided into a plurality of blocks including an anchor block indicating a start or a stop of a graphical pattern of the watermark. In this manner, the watermark can be systematically designed in a graphical pattern having a start and/or stop so that each copy of the watermark in respective regions can be distinguished from one another. Furthermore, the watermark extending across the screen image has redundancies in the multiple copies in the plurality of regions and therefore even a partial capture of the screen image can be used to trace the data leak.

At 812, the method 800 may include, at the server computing device, receiving secure information and a hash value corresponding to the secure information once the client device has triggered the policy. At 814, the method 800 may include, at the server computing device, storing the secure information and hash value. Thus, the secure information, which may relate to the circumstances of the display of the policy-covered document which triggered the policy, may be sent to the server computing device to be stored in association with a hash value so that if the hash value were made publicly available, the secure information would not be compromised and would remain secure. For example, the secure information may include at least one of a document file name, a document file type, a document file path, a timestamp, and a device and/or user identifier of the client device. Thus, the secure information may be used to trace the data leak.

At 816, the method 800 may include, at the server computing device or another computing device, receiving a camera-captured image of the display screen including at least a portion of the watermark. At 818, the method 800 may include, at the server computing device or another computing device, decoding the secure information from the watermark. Accordingly, the secure information may be securely associated with the camera-captured image and therefore the data leak, without creating in a sense a second data leak via the watermark. Furthermore, due to the robustness of the dynamic watermark, even a camera-captured image is decoded into the secure information. The secure information may be encoded in a graphical pattern of the watermark, as discussed above. This encoding process may aid in keeping the secure information secure, as compared to printing text directly. Further, the graphical pattern may illustrate a binary code using at least one of dots and dashes. These dots and dashes allow the content in the screen image to be seen without obstruction while providing a simple way to encode the secure information into the watermark. More specifically, in some instances, the secure information may be encoded in the watermark as a hash value. A hash value may be a short and simple string that is easily converted into binary or another code without overcomplicating or enlarging the watermark. In such an instance, at 820, the method 800 may include, at the server computing device, in response to a query including the hash value that is decoded from the watermark, retrieving the secure information. Thus, the server computing device, having received the secure information at the time of the policy being triggered and stored the secure information in association with the hash value, is able to produce the associated secure information in response to the query. Therefore, only users with access to the server computing device would have access to the secure information, keeping it safe and confidential.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
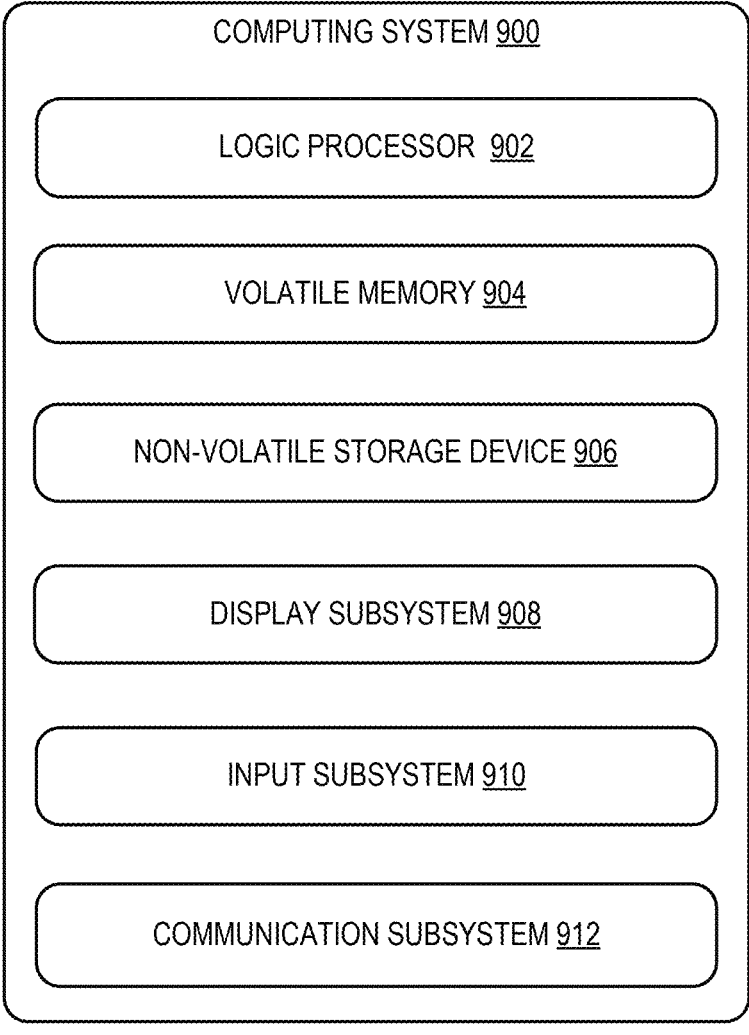
FIG. 9 shows a schematic view of an example computing environment in which the computing system of FIG. 1 may be enacted.

FIG. 9 schematically shows a non-limiting embodiment of a computing system 900 that can enact one or more of the methods and processes described above. Computing system 900 is shown in simplified form. Computing system 900 may embody the computing system 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computing system for protection against unauthorized document sharing. The computing system may comprise a server computing device including a processor having associated memory. The processor may be configured to execute instructions using portions of the memory to cause the server computing device to implement a data leak prevention compliance portal where a policy is established covering a plurality of documents, and transmit the policy to a client device having an associated display screen. The policy, in response to being triggered at the client device, may cause the client device to modify a graphics pipeline to add an opaque watermark to a screen image displayed on the display screen. In this aspect, additionally or alternatively, the computing system may be further configured to receive a camera-captured image of the display screen including at least a portion of the watermark, and decode secure information from the watermark. In this aspect, additionally or alternatively, the secure information may be encoded in the watermark as a hash value. In this aspect, additionally or alternatively, the server computing device may be further configured to receive the secure information and the hash value corresponding to the secure information once the client device has triggered the policy, store the secure information and hash value, and in response to a query including the hash value that is decoded from the watermark, retrieve the secure information. In this aspect, additionally or alternatively, the secure information may be encoded in a graphical pattern of the watermark. In this aspect, additionally or alternatively, the graphical pattern may illustrate a binary code using at least one of dots and dashes. In this aspect, additionally or alternatively, the secure information may include at least one of a document file name, a document file type, a document file path, a timestamp, and a device and/or user identifier of the client device. In this aspect, additionally or alternatively, the policy may be further configured to cause the client device to divide the screen image into a plurality of regions and display the watermark in each of the plurality of regions. In this aspect, additionally or alternatively, each of the plurality of regions may be divided into a plurality of blocks including an anchor block indicating a start or a stop of a graphical pattern of the watermark. In this aspect, additionally or alternatively, each block may encode 1 bit of data in a graphical pattern such that the graphical pattern of one region formed of the plurality of blocks encodes a plurality of bits of data.

Another aspect provides a method for protection against unauthorized document sharing. The method may comprise, at a server computing device, implementing a data leak prevention compliance portal where a policy is established covering a plurality of documents, and transmitting the policy to a client device having an associated display screen. The policy, in response to being triggered at the client device, may cause the client device to modify a graphics pipeline to add an opaque watermark to a screen image displayed on the display screen. In this aspect, additionally or alternatively, the method may further comprise receiving a camera-captured image of the display screen including at least a portion of the watermark, and decoding secure information from the watermark. In this aspect, additionally or alternatively, the secure information may be encoded in the watermark as a hash value. In this aspect, additionally or alternatively, the method may further comprise, at the server computing device, receiving the secure information and the hash value corresponding to the secure information once the client device has triggered the policy, storing the secure information and hash value, and in response to a query including the hash value that is decoded from the watermark, retrieving the secure information. In this aspect, additionally or alternatively, the secure information may be encoded in a graphical pattern of the watermark. In this aspect, additionally or alternatively, the graphical pattern may illustrate a binary code using at least one of dots and dashes. In this aspect, additionally or alternatively, the secure information may include at least one of a document file name, a document file type, a document file path, a timestamp, and a device and/or user identifier of the client device. In this aspect, additionally or alternatively, the policy may be further configured to cause the client device to divide the screen image into a plurality of regions and display the watermark in each of the plurality of regions. In this aspect, additionally or alternatively, each of the plurality of regions may be divided into a plurality of blocks including an anchor block indicating a start or a stop of a graphical pattern of the watermark.

Another aspect provides a computing system for protection against unauthorized document sharing. The computing system may comprise a server computing device including a processor having associated memory. The processor may be configured to execute instructions using portions of the memory to cause the server computing device to implement a data leak prevention compliance portal where a policy is established covering a plurality of documents, and transmit the policy to a client device having an associated display screen. The policy, in response to being triggered at the client device, may cause the client device to divide a screen image displayed on the display screen into a plurality of regions, modify a graphics pipeline to add a watermark to be displayed in each of the plurality of regions, and divide each of the plurality of regions into a plurality of blocks each including an anchor block indicating a start or a stop of a graphical pattern of the watermark.

Another aspect provides a computing system for protection against unauthorized document sharing. The computing system may comprise a computing device including a processor having associated memory and an associated display screen. The processor may be configured to execute instructions using portions of the memory to cause the computing device to implement a data leak prevention compliance service. The computing device is configured to receive a policy covering a plurality of documents. In response to the policy being triggered, the compliance service is configured to modify a graphics pipeline to add an opaque watermark to a screen image displayed on the display screen.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for protection against unauthorized document sharing, comprising:
   a server computing device including a processor having associated memory, the processor being configured to execute instructions using portions of the memory to cause the server computing device to:
   implement a data leak prevention compliance portal where a policy is established covering a plurality of documents;
   transmit the policy to a client device having an associated display screen, wherein the policy, in response to being triggered at the client device, causes the client device to modify a graphics pipeline by a windows manager of the client device at an operating system (OS) level to add an opaque watermark to a screen image displayed on the display screen;
   receive a camera-captured image of the display screen including at least a portion of the watermark; and
   decode secure information from the watermark.

2. The computing system of claim 1, wherein the secure information is encoded in the watermark as a hash value.

3. The computing system of claim 2, wherein the server computing device is further configured to:
   receive the secure information and the hash value corresponding to the secure information once the client device has triggered the policy;
   store the secure information and hash value; and
   in response to a query including the hash value that is decoded from the watermark, retrieve the secure information.

4. The computing system of claim 1, wherein the secure information is encoded in a graphical pattern of the watermark.

5. The computing system of claim 4, wherein the graphical pattern illustrates a binary code using at least one of dots and dashes.

6. The computing system of claim 1, wherein the secure information includes at least one of a document file name, a document file type, a document file path, a timestamp, and a device and/or user identifier of the client device.

7. The computing system of claim 1, wherein the policy is further configured to cause the client device to divide the screen image into a plurality of regions and display the watermark in each of the plurality of regions.

8. The computing system of claim 7, wherein each of the plurality of regions is divided into a plurality of blocks including an anchor block indicating a start or a stop of a graphical pattern of the watermark.

9. The computing system of claim 7, wherein each block encodes 1 bit of data in a graphical pattern such that the graphical pattern of one region formed of the plurality of blocks encodes a plurality of bits of data.

10. The computing system of claim 1, wherein the screen image is a final rendered screen image displayed by the entire display screen.

11. A method for protection against unauthorized document sharing, comprising:

at a server computing device:

implementing a data leak prevention compliance portal where a policy is established covering a plurality of documents; and transmitting the policy to a client device having an associated display screen, wherein the policy, in response to being triggered at the client device, causes the client device to modify a graphics pipeline by a windows manager of the client device at an operating system (OS) level to add an opaque watermark to a screen image displayed on the display screen;

receiving a camera-captured image of the display screen including at least a portion of the watermark; and decoding secure information from the watermark.

12. The method of claim 11, wherein the secure information is encoded in the watermark as a hash value.

13. The method of claim 12, further comprising, at the server computing device:

receiving the secure information and the hash value corresponding to the secure information once the client device has triggered the policy;

storing the secure information and hash value; and in response to a query including the hash value that is decoded from the watermark, retrieving the secure information.

14. The method of claim 11, wherein the secure information is encoded in a graphical pattern of the watermark.

15. The method of claim 14, wherein the graphical pattern illustrates a binary code using at least one of dots and dashes.

16. The method of claim 11, wherein the secure information includes at least one of a document file name, a document file type, a document file path, a timestamp, and a device and/or user identifier of the client device.

17. The method of claim 11, wherein the policy is further configured to cause the client device to divide the screen image into a plurality of regions and display the watermark in each of the plurality of regions.

18. The method of claim 17, wherein each of the plurality of regions is divided into a plurality of blocks including an anchor block indicating a start or a stop of a graphical pattern of the watermark.

19. The method of claim 11, wherein the screen image is a final rendered screen image displayed by the entire display screen.

20. A computing system for protection against unauthorized document sharing, comprising:

a server computing device including a processor having associated memory, the processor being configured to execute instructions using portions of the memory to cause the server computing device to:

implement a data leak prevention compliance portal where a policy is established covering a plurality of documents; and transmit the policy to a client device having an associated display screen, wherein the policy, in response to being triggered at the client device, causes the client device to:

divide a screen image displayed on the display screen into a plurality of regions;

modify a graphics pipeline by a windows manager of the client device at an operating system (OS) level to add a watermark to be displayed in each of the plurality of regions; and divide each of the plurality of regions into a plurality of blocks each including an anchor block indicating a start or a stop of a graphical pattern of the watermark;

receive a camera-captured image of the display screen including at least a portion of the watermark; and decode secure information from the watermark.

* * * * *